METHOD OF PRODUCING A SILICON SEMICONDUCTOR DEVICE
Filed Aug. 15, 1962
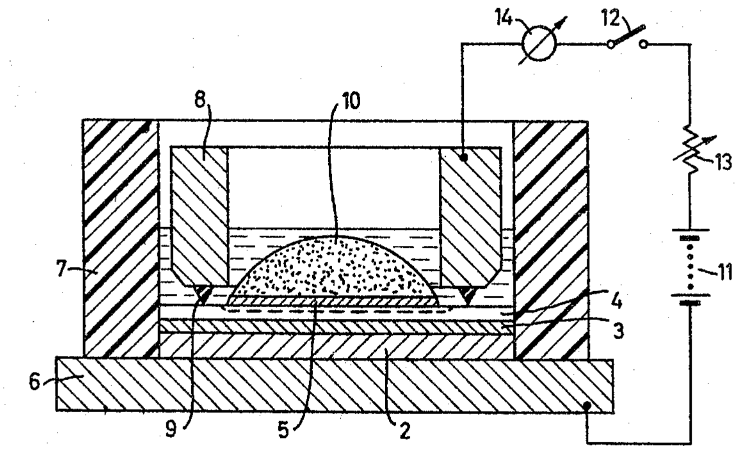

United States Patent Office 3,264,201
Patented August 2, 1966

3,264,201
METHOD OF PRODUCING A SILICON SEMICONDUCTOR DEVICE

Norbert Schink and Rupert Stoiber, Erlangen, Germany, assignors to Siemens-Schuckertwerke Aktiengesellschaft, Berlin-Siemensstadt, Germany and at Erlangen, Germany, a corporation of Germany Filed Aug. 15, 1962, Ser. No. 217,011
Claims priority, application Germany, Aug. 19, 1961, S 75,370
2 Claims. (Cl. 204—56)

Our invention relates to the production of electronic semiconductor devices such as rectifiers, transistors, photodiodes, four-layer and other junction and multiple-junction devices. Such semiconductor devices, as a rule, consist of a monocrystalline semiconductor body of germanium, silicon or intermetallic semiconductor compounds such as InSb, InAs, GaAs, GaP and other semiconductor compounds of elements from the third and fifth B-groups respectively of the periodic system of elements. The crystalline semiconductor body is provided with electrodes that are joined with the semiconductor substance by diffusion or alloying. In the course of production, such semiconductor devices are usually subjected to etching methods for the purpose of eliminating impurities and crystal-lattice disturbances from the surfaces. After thus eliminating disturbed or contaminated surface layers, the surfaces are often oxidized for the purpose of stabilizing their properties. This can be done, for example, anodically by treating the semiconductor body in an aqueous, weakly acidic electrolyte as is shown in U.S. Patent 3,010,885 of N. Schink.

In a more particular aspect, our invention relates to a production method in which a silicon semiconductor body with a substantially monocrystalline semiconductor body and one or more p-n junctions is anodically treated in a weakly acidic electrolyte to form an insulating protective coating by oxidation of the semiconductor surface.

It is an object of our invention to improve such production methods and the results obtained thereby, by increasing the density of the oxidized insulating coating and thus increasing its resistance to chemical attack.

To this end, and in accordance with our invention, such anodic treatment of the semiconductor body is performed in an electrolyte prepared by boiling a mixture composed of substantially equal moles of boric acid, ethylene glycol and aqueous ammonia. The oxide coatings produced in this manner are completely dense and without discernible pores. It has been found, for example, that the surface of semiconductor bodies thus treated are not attacked by elemental chlorine at a temperature of several hundred degrees centigrade. The invention will be further amplified with reference to an embodiment showing further details and advantages. For this purpose, there is shown on the accompanying drawing, by way of example, a rectifier device, which is being treated by means of equipment suitable for performing the method of the invention.

The rectifier member according to the drawing is composed of a carrier plate 3, the crystalline semiconductor body proper 4, and an electrode alloy 5 bonded to the semiconductor body. This rectifier member can be produced, for example, in the following manner.

An aluminum disc 3 of about 20 mm. diameter is placed in coaxial face-to-face relation to the molybdenum disc upon a molybdenum disc 2 of about 20 mm. diameter. A circular plate or disc 4 of p-type silicon, having a specific electric resistance of about 1000 ohm cm. and a diameter of about 20 mm., is coaxially placed upon the aluminum disc 3 in face-to-face contact therewith. Thereafter a golid-antimony foil having a diameter, for example 15 mm., which is somewhat smaller than the silicon plate, is placed upon the silicon body. The entire assembly is then pressed into an embedding powder, of a material which does not react with the above-mentioned metals and does not melt at the processing temperature to be subsequently applied. Suitable as this embedding powder is graphite. The assembly, within its embedment, is then heated under pressure to a temperature of about 800° C. This heating can be performed, for example, in an alloying furnace which is evacuated or filled with protective gas such as argon.

The resulting product is the illustrated rectifier member composed of the carrier plate 2 of molybdenum, the semiconductor plate 4 joined with the carrier plate 2 by an aluminum alloy 3 and carrying an alloyed electrode 5 of gold. Due to the original antimony content of the gold foil, which during the alloying process migrated into the adjacent zone of the silicon, this zone was converted to n-type conductance, thereby producing a p-n junction. The p-n junction produced by the migration of antimony into the p-type silicon is represented on the drawing by a broken line.

The anodic treatment for producing an oxide coating is particularly important at those localities of a semiconductor device at which a p-n junction emerges at the surface, because at these localities, when the p-n junction is blocked, the full blocking (peak inverse voltage) produces at the surface a strong electric field that may result in undesirable bridging of the p-n junction.

The equipment employed for treating the rectifier device comprises a base plate 6. This plate may, for example, consist of gold or other metals gilded on its upper surface. The processing equipment further comprises a hollow cylinder 7 placed upon the base 6. The cylinder 7 consists of acid-resistant material, preferably synthetic plastic such as polytetrafluoroethylene (Teflon). The molybdenum carrier plate of the rectifier device is placed flat upon the top surface of the base 6 and is thus in good electrically conducting connection with the base. Another hollow cylinder 8, consisting preferably of metal, for example steel or silver, is disposed within the hollow cylinder 7 in such a position that it is located opposite the annular locality where the p-n junction emerges at the top side of the semiconductor body 4. Three or four spacer pieces 9, consisting preferably likewise of acid-resistant synthetic material, maintain the cylinder 8 in proper position. The electrode 5, consisting essentially of a gold-silicon eutectic, is covered by a mound 10 of molten cane sugar which prevents the electrolyte liquid from contacting the electrode 5. The cane sugar can be substituted by some other suitable mass or covering, for example a plate of synthetic plastic. In some cases, covering the electrode is unnecessary, because it is sufficiently resistant to chemical attack by the electrolyte.

The base plate 6 is connected with the positive pole of a current source which is shown here to consist of a battery 11, whose negative pole is connected to the hollow cylinder 8. A switch 12, a control resistor 13 and a measuring instrument 14 such as an ammeter complete the electric circuit.

The space constituted by the base plate 6 and the hollow cylinder 7 is filled with an electrolyte produced by boiling a mixture of boric acid, glycol and aqueous ammonia. Such electrolytes are known as dielectric liquid in electrolytic capacitors. We have discovered that this electrolyte produces excellent results in the anodic oxidation of semiconductor surfaces.

Such an electrolyte can be produced, for example, in the following manner. 800 g. boric acid, 700 g. ethylene glycol and 400 g. aqueous ammonia (about 28% solution) are boiled for about one and one-half hours. The boiling point is at 138° C. Another applicable mixture consists of 650 g. boric acid, 700 g. ethylene glycol and 400 g. aqueous ammonia and possesses a boiling point of 132° C. After boiling, the electrolyte constitutes a syrupy mass.

The anodic treatment of the semiconductor device described above was performed, for example, as follows. A constant current of 1 ma. was passed through the processing circuit, the current intensity being observed by means of the current measuring instrument 14 and kept constant by means of the control resistor 13. The voltage required for this purpose was initially 15 volts and was increased to an ultimate value of 200 volts. This increase was partially due to the production of the desired oxide coating and partially to the dissociation of the electrolyte.

We have found that during dissociation of the electrolyte there occur electrically insulating layers which can be built down by increasing the current. A preferred treatment, therefore, proceeds by first operating for several minutes with a current of about 1 ma. and thereafter increasing the current for one-half minute to about 50 ma., then again operating for several minutes with one ma., again increasing the current and periodically repeating this mode of operation. The current density for the first step is between 0.1 and 5 ma./cm$^2$, preferably about 1 and the current density at the increased value is between 30 to 100 ma./cm.$^2$, preferably about 50. The entire treatment can then be terminated after one-half to one hour. The treated semiconductor body then exhibits an oxide skin which scintillates in interference colors.

The semiconductor surface can be subjected to the conventional etching treatment prior to the above-described anodic treatment. The etching can be effected, for example, with the aid of a commercial C.P. etching solution consisting essentially of nitric acid and hydrofluoric acid. However, the method according to the invention also permits doing away with the preliminary etching and to subject any disturbed surface layer of the crystalline semiconductor body to the anodic treatment. Very good results have been obtained in this manner.

After the anodic treatment the semiconductor device is rinsed with distilled water, thus completely removing the electrolyte as well as any residues of the cane sugar 10. It is preferable to follow the rinsing step by drying immediately in a flow of heated air. It is further of advantage to then subject the device to tempering in air at 200 to 350° C. for a period of one to several hours.

To those skilled in the art, it will be obvious upon a study of this disclosure, that the invention can be modified in various respects and be employed with other semiconductor devices in an analogous manner, for example to the anodic treatment of transistors, silicon-controlled rectifiers and other semiconductor devices. The above-mentioned current and voltage values apply to the particular example described and to the above-mentioned dimensions of the rectifier device, and are preferably adapted to the particular type and size of semiconductor members to be processed.

We claim:

1. In the method of treating a substantially monocrystalline silicon semiconductor body having at least one p-n junction and having a surface at which a p-n junction emerges, the improvement which comprises anodically treating the semiconductor in an electrolyte prepared by boiling a mixture of substantially equal moles of boric acid, ethylene glycol and aqueous ammonia, to form a dense protective insulating coating.

2. In the method of treating a substantially monocrystalline silicon semiconductor body having at least one p-n junction and having a surface at which a p-n junction emerges, the improvement which comprises preparing a weakly acidic electrolyte by boiling a mixture of substantially equal moles of boric acid, ethylene glycol and aqueous ammonia and anodically treating the semiconductor body in said electrolyte at a current density from about 0.1 to 5 ma./cm.$^2$ then at a current density from about 30 to 100 ma./cm.$^2$, to form a dense pore free insulating protective oxidized coating.

References Cited by the Examiner

UNITED STATES PATENTS

| | | | |
|---|---|---|---|
| 2,231,373 | 2/1941 | Schenk | 204—56 |
| 2,560,792 | 7/1951 | Gibney | 175—366 |
| 2,739,110 | 3/1956 | Ruscetta et al. | 204—56 |
| 2,785,116 | 3/1957 | Bolton et al. | 204—56 X |

FOREIGN PATENTS

| | | |
|---|---|---|
| 895.695 | 5/1962 | Great Britain. |

JOHN H. MACK, *Primary Examiner.*

G. KAPLAN, *Assistant Examiner.*